United States Patent
Miyata (10) Patent No.: US 7,331,600 B2
(45) Date of Patent: Feb. 19, 2008

(54) AIRBAG APPARATUS, MOTORCYCLE WITH AIRBAG APPARATUS, AND METHOD OF MANUFACTURING AIRBAG APPARATUS

(75) Inventor: Yasuhito Miyata, Shiga (JP)

(73) Assignee: Takata Corporation (JP)

( * ) Notice: Subject to any disclaimer, the term of this patent is extended or adjusted under 35 U.S.C. 154(b) by 10 days.

(21) Appl. No.: 10/601,927

(22) Filed: Jun. 23, 2003

(65) Prior Publication Data

US 2004/0051281 A1 Mar. 18, 2004

(30) Foreign Application Priority Data

Jun. 27, 2002 (JP) .............................. 2002-188006

(51) Int. Cl.
*B60R 21/16* (2006.01)

(52) U.S. Cl. .................................................. 280/730.1

(58) Field of Classification Search ............ 280/730.1, 280/743.1, 743.2
See application file for complete search history.

(56) References Cited

U.S. PATENT DOCUMENTS

| | | | | |
|---|---|---|---|---|
| 3,879,057 A | * | 4/1975 | Kawashima et al. | 280/743.2 |
| 5,022,675 A | * | 6/1991 | Zelenak et al. | 280/743.1 |
| 5,308,113 A | * | 5/1994 | Moriset | 280/743.2 |
| 5,310,214 A | * | 5/1994 | Cuevas | 280/729 |
| 5,358,273 A | * | 10/1994 | Onishi et al. | 280/743.1 |
| 5,362,101 A | * | 11/1994 | Sugiura et al. | 280/743.2 |
| 5,380,038 A | * | 1/1995 | Hawthorn et al. | 280/730.1 |
| 5,489,119 A | * | 2/1996 | Prescaro et al. | 280/743.2 |
| 5,513,877 A | * | 5/1996 | MacBrien et al. | 280/732 |
| 5,746,447 A | * | 5/1998 | Dyer et al. | 280/743.2 |
| 5,945,184 A | * | 8/1999 | Nagata et al. | 428/35.2 |
| 5,967,545 A | * | 10/1999 | Iijima et al. | 280/730.1 |
| 6,007,090 A | * | 12/1999 | Hosono et al. | 280/730.2 |
| 6,302,433 B1 | * | 10/2001 | Ellerbrok et al. | 280/729 |
| 6,361,072 B1 | * | 3/2002 | Barnes | 280/743.1 |
| 6,554,316 B2 | * | 4/2003 | Schneider et al. | 280/743.1 |
| 6,572,144 B2 | * | 6/2003 | Igawa | 280/743.1 |
| 6,685,217 B2 | * | 2/2004 | Abe | 280/730.1 |
| 6,692,023 B2 | * | 2/2004 | Tokita et al. | 280/743.1 |
| 6,832,780 B2 | * | 12/2004 | Amamori | 280/743.2 |
| 2004/0007855 A1 | * | 1/2004 | Kurata et al. | 280/729 |
| 2004/0150197 A1 | * | 8/2004 | Ijima et al. | 280/730.1 |

FOREIGN PATENT DOCUMENTS

| | | |
|---|---|---|
| DE | 85 08 646 U | 6/1985 |
| EP | 1234731 | 8/2002 |
| GB | 2130150 A * | 5/1984 |
| JP | 2002137780 | 5/2002 |
| JP | 2003011871 | 1/2003 |
| JP | 2001219885 | 8/2004 |

* cited by examiner

*Primary Examiner*—Faye M. Fleming
(74) *Attorney, Agent, or Firm*—Fitch, Even, Tabin & Flannery (57) ABSTRACT

There is provided an airbag apparatus having an airbag and mounted to a motorcycle, wherein the inflation of the airbag in an extending direction of a tether is restricted with the tether extending so as to connect the opposing portions of the airbag.

17 Claims, 9 Drawing Sheets

AIRBAG APPARATUS, MOTORCYCLE WITH AIRBAG APPARATUS, AND METHOD OF MANUFACTURING AIRBAG APPARATUS

FIELD OF THE INVENTION

The present invention relates to a technique of constructing an airbag apparatus mounted to a motorcycle.

BACKGROUND OF THE INVENTION

There is a known technique of protecting an occupant by an airbag apparatus mounted to a motorcycle. For example, Japanese Unexamined Patent Application Publication No. 2001-219885 discloses a technique of inflating an airbag to deploy it into a spacing between a vehicle component such as a head pipe and an occupant seat of a motor scooter. This technique presents the possibility of mounting an airbag apparatus to a motorcycle. However, there is a high requirement for complete protection of an occupant by pursuit of a rational inflation pattern of the airbag in the event of an accident.

SUMMARY OF THE INVENTION

The present invention has been made in consideration of the above situation. Accordingly, it is an object of the invention to provide an airbag construction technique for a motorcycle, which contributes to complete protection of an occupant in the event of an accident.

In order to solve the above problems, the invention as set forth in each claim.

According to the invention, there is provided an airbag apparatus having an airbag and mounted to a motorcycle. The airbag includes inflation control means. The inflation control means is constructed so as to restrict the inflation of the airbag in an occupant moving direction when the motorcycle comes in a frontal collision and to allow inflation of the airbag in a direction intersecting the occupant moving direction. Cooperation of the restriction of the inflation in the occupant moving direction and the allowance of the inflation in the direction intersecting the moving direction promotes the inflation of the airbag in the direction intersecting the occupant moving direction. Therefore, an occupant restraint area can be increased for the occupant moving direction.

According to the invention of claim 1, there is provided an airbag apparatus having an airbag and mounted to a motorcycle. The airbag includes inflation control means. The inflation control means is constructed so as to restrict the inflation of the airbag in an occupant moving direction when the motorcycle comes in a frontal collision and to allow inflation of the airbag in a direction intersecting the occupant moving direction. Cooperation of the restriction of the inflation in the occupant moving direction and the allowance of the inflation in the direction intersecting the moving direction promotes the inflation of the airbag in the direction intersecting the occupant moving direction. Therefore, an occupant restraint area can be increased for the occupant moving direction.

According to the invention, cooperation of the restriction and the allowance of the inflating direction of the airbag with the inflation control means promotes the inflation of the airbag in the direction intersecting the occupant, thereby rationally increasing the occupant restraint area by the airbag, and thus minimizing the danger of throwing-out of the occupant forward of the motorcycle by crash impact.

Particularly, the inflation of the airbag in the direction intersecting the occupant ensures that the occupant is received in an accident or, alternatively, effectively prevents the occupant from being thrown out forward so as to slide on the airbag surface.

In view of the above, in the invention, "restricting inflation in an occupant moving direction" implies that it is sufficient to restrict the inflation of the airbag in at least the occupant moving direction, broadly including both of an arrangement of restricting the inflation of the airbag in other directions and an arrangement of not restricting it. "Allowing the inflation in a direction intersecting the occupant moving direction" implies a direction effective to prevent forward movement of the occupant in the event of the accident, broadly including not only an arrangement in which the inflation is orthogonal to the occupant moving direction but also an arrangement in which the inflation intersects it at a given angle. "Restricting" and "allowing" of the inflation of the airbag imply that it is sufficient for the airbag to be allowed to inflate in the direction intersecting the occupant moving direction so that the airbag is inflated to intersect the occupant who is being moved forward of the motorcycle by the impact of the frontal collision, thereby increasing the occupant restraint area. The degree of the restriction and allowance of the inflation is no object.

In the specification, the "motorcycle" broadly includes a saddle vehicle, that is, a vehicle with an arrangement in which an occupant sits astride the seat, such as a two-wheeled vehicle having a fuel tank ahead of an occupant seat and a scooter-type motorcycle having a spacing between an occupant seat and a handle-supporting head pipe. Furthermore, in addition to the motorcycles, the "motorcycle" broadly includes a vehicle having three or more running wheels for an occupant to sit astride the seat (for example, a three wheeled vehicle used to deliver pizzas, etc., and a three or a four-wheeled buggy type vehicle for bad roads) and a vehicle for an occupant to sit astride a seat while running in a caterpillar tread or a sled such as a snowmobile.

The "frontal collision" in the specification broadly implies not only a state in which the motorcycle literally collides with the object in a straight line but also a state in which the motorcycle collides with the object in a slanting direction and a state in which only part of the front portion collides with the object in a straight line. Typically, it is preferable for the "airbag apparatus" of the specification to house the airbag and the means for inflating the airbag, such as an inflator, in a retainer.

In the airbag apparatus, preferably, the inflation control means includes tethering means. Preferably, the tethering means connects at least the opposing portions of the airbag to restrict the inflation of the airbag in the occupant moving direction in a frontal collision. Since the tethering means connects the opposing portions of the airbag in the occupant moving direction in the frontal collision, the invention offers an advantage in increasing the rigidity of the airbag during the occupant restraints and particularly, increasing the reaction force of the airbag against the kinetic energy of the occupant who is moving forward by the impact of the frontal collision.

In the airbag apparatus of claim 1, preferably, the inflation control means includes tethering means. Preferably, the tethering means connects at least the opposing portions of the airbag to restrict the inflation of the airbag in the occupant moving direction in a frontal collision. Since the tethering means connects the opposing portions of the airbag in the occupant moving direction in the frontal collision, the invention offers an advantage in increasing the rigidity of the airbag during the occupant restraint, and particularly, increasing the reaction force of the airbag against the kinetic energy of the occupant who is moving forward by the impact of the frontal collision in addition to the advantages of the invention of claim 1.

In the invention, for the connecting portion through the tethering means, it is sufficient to restrict the inflation of the airbag in the occupant moving direction in the event of an accident and there is no need to closely correspond to the occupant moving direction in a frontal collision, so that it is sufficient to connect the opposing portions of the airbag nearly over the occupant moving direction. The tethering means may be arranged either inside or outside the airbag and the shape is no object. For example, arranging a belt-shaped tether in the airbag and stitching the ends of the tether to the opposing inner wall of the airbag allow the restriction of the inflation of the airbag in the occupant moving direction in a frontal collision. The tethering means may be attached to the opposing portions of the airbag and also to other portions.

According to another aspect of the invention, there is provided an airbag apparatus having an airbag and mounted to a motorcycle. The airbag includes a tether extending so as to connect the opposing portions of the airbag. Preferably, the tether can employ a strap-shaped tether. The arrangement of "connecting the opposing portions of the airbag" broadly includes an arrangement in which the two opposing portions are connected with the tether in the shortest distance and an arrangement in which the opposing portions of the airbag are connected with the tether arranged along the inner periphery or outer periphery of the airbag. The number of the connecting portions and the number of the tethers are not limited. For example, in addition to the opposing portions, other portions of the airbag may be connected with one tether or, alternatively, the plurality of portions may be connected together with a plurality of tethers. Furthermore, a plurality of tethers may be arranged to connect a plurality of portions.

According to the invention of claim 3, there is provided an airbag apparatus having an airbag and mounted to a motorcycle. The airbag includes a tether extending so as to connect the opposing portions of the airbag. Preferably, the tether can employ a strap-shaped tether. The arrangement of "connecting the opposing portions of the airbag" broadly includes an arrangement in which the two opposing portions are connected with the tether in the shortest distance and an arrangement in which the opposing portions of the airbag are connected with the tether arranged along the inner periphery or outer periphery of the airbag. The number of the connecting portions and the number of the tethers are not limited. For example, in addition to the opposing portions, other portions of the airbag may be connected with one tether or, alternatively, the plurality of portions may be connected together with a plurality of tethers. Furthermore, a plurality of tethers may be arranged to connect a plurality of portions.

In the airbag apparatus according to another aspect of the invention, inflation of the airbag in the extending direction of the tether is restricted to allow the inflation of the airbag to be guided in the direction that intersects the extending direction of the tether, thus rationally increasing the occupant restraint area of the airbag by appropriately controlling the restricting direction of the inflation of the airbag with the tether. Particularly, in the invention, the tethers for restricting the inflation are arranged in a plurality of portions of the airbag, so that the inflation of the airbag can be adjusted so that the shape of the inflated airbag fits to the front body form of the occupant or, alternatively, the shape of the inflated airbag is appropriately set, so that it can be controlled which part of the occupant first comes in contact with the airbag.

In the airbag apparatus according to the invention of claim 3, inflation of the airbag in the extending direction of the tether is restricted to allow the inflation of the airbag to be guided in the direction that intersects the extending direction of the tether, thus rationally increasing the occupant restraint area of the airbag by appropriately controlling the restricting direction of the inflation of the airbag with the tether. Particularly, in the invention, the tethers for restricting the inflation are arranged in a plurality of portions of the airbag, so that the inflation of the airbag can be adjusted so that the shape of the inflated airbag fits to the front body form of the occupant or, alternatively, the shape of the inflated airbag is appropriately set, so that it can be controlled which part of the occupant first comes in contact with the airbag.

The feature of the invention that the shape of the inflated airbag can appropriately be controlled with the tether is effective particularly in preventing pitching motion. More specifically, the inflation of the airbag is appropriately restricted with the tether, so that the possibility that the occupant is thrown out forward from above the inflated airbag can be minimized, thus ensuring complete protection of the occupant in the event of an accident.

The feature of the invention of claim 3 that the shape of the inflated airbag can appropriately be controlled with the tether is effective particularly in preventing pitching motion. More specifically, the inflation of the airbag is appropriately restricted with the tether, as in claim 4, so that the possibility that the occupant is thrown out forward from above the inflated airbag can be minimized, thus ensuring complete protection of the occupant in the event of an accident.

The "pitching motion" is one of typical behaviors of the motorcycle during a frontal collision, meaning a behavior of the motorcycle in which the rear wheel of the motorcycle rises up by the kinetic energy of the motorcycle and the motorcycle is rotated forwardly with the center at the rotation center of the front wheel or the vicinity of the collide portion. "Forward of the occupant when the motorcycle makes a pitching motion" broadly includes the side or direction to/in which the occupant is thrown out forward of the rotation when the motorcycle makes a pitching motion.

In another aspect of the invention, there is provided a rational method of manufacturing an airbag apparatus offering advantages that are substantially similar to some of those of the previously discussed airbag apparatuses. More specifically, there is provided a method of manufacturing an airbag apparatus wherein the inflation of the airbag is restricted for the occupant moving direction when the motorcycle comes in a frontal collision, thus increasing the occupant restraint area in the event of an accident without particularly increasing the size of the airbag. Of course, it is also possible to provide a method of manufacturing an airbag apparatus having components similar to those of the airbag apparatuses as previously set forth.

In the inventions of claims 6 and 7, there is provided a rational method of manufacturing an airbag apparatus offering advantages that are substantially similar to those of the airbag apparatuses of claims 1 and 3. More specifically, according to the invention of claim 6, there is provided a method of manufacturing an airbag apparatus wherein the inflation of the airbag is restricted for the occupant moving direction when the motorcycle comes in a frontal collision, thus increasing the occupant restraint area in the event of an accident without particularly increasing the size of the airbag. Of course, it is also possible to provide a method of manufacturing an airbag apparatus having components similar to those of the airbag apparatuses as set forth in the dependent claim of claim 1.

In another form of the invention, when the tether is arranged to the airbag, the opposing portions of the airbag are connected with the tether so that the inflation of the airbag in the extending direction of the tether is restricted when the motorcycle comes in a frontal collision. Accordingly, the occupant restraint area can rationally be increased by controlling the extending direction of the tether as appropriate without particularly increasing the size of the airbag. Of course, it is also possible to provide a method of manufacturing an airbag apparatus having components similar to some of those of the previously discussed airbag apparatuses.

In the invention of claim 7, when the tether is arranged to the airbag, the opposing portions of the airbag are connected with the tether so that the inflation of the airbag in the extending direction of the tether is restricted when the motorcycle comes in a frontal collision. Accordingly, the occupant restraint area can rationally be increased by controlling the extending direction of the tether as appropriate without particularly increasing the size of the airbag. Of course, it is also possible to provide a method of manufacturing an airbag apparatus having components similar to those of the airbag apparatuses as set forth in the dependent claim of claim 3.

DETAILED DESCRIPTION OF THE PREFERRED EMBODIMENTS

Figure 1:
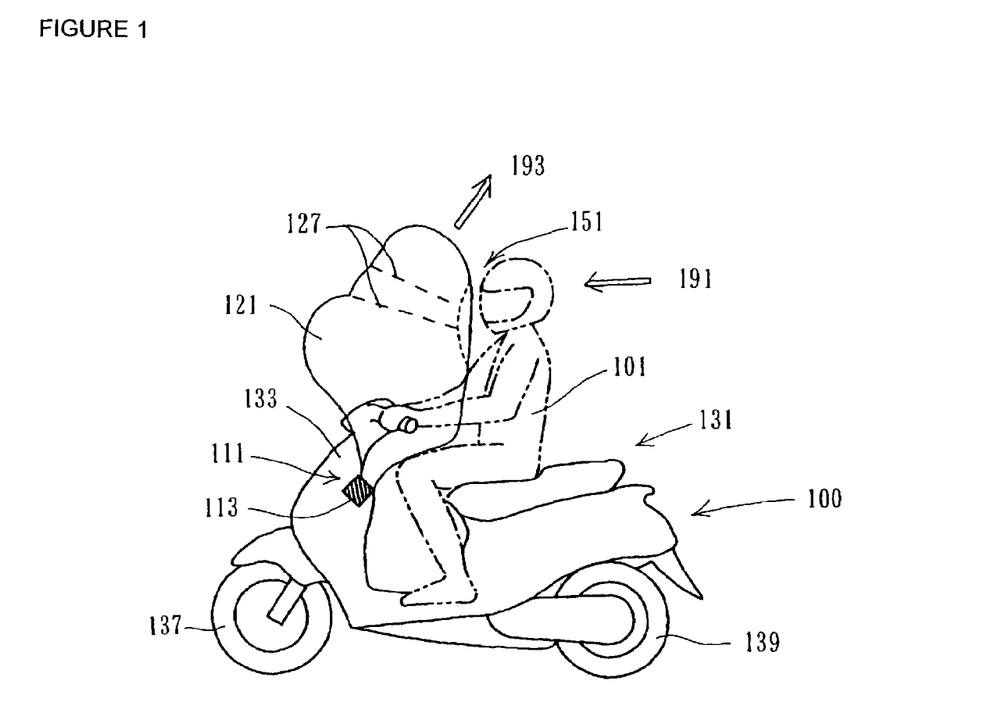
FIG. 1 shows the overall structure of a motorcycle according to an embodiment of the present invention.

Embodiments of the present invention will be specifically described with reference to the drawings. FIG. 1 shows a scooter-type motorcycle 100 and an airbag apparatus 111 mounted to the motorcycle 100 according to an embodiment of the invention. The motorcycle 100 corresponds to an example of a motorcycle of the invention. The motorcycle 100 has a body structure 131 including a front wheel 137 and a rear wheel 139 for an occupant 101 to ride astride. The airbag apparatus 111 is arranged at a front cowl 133 constituting the body structure 131.

The front area of the occupant 101 above the body structure 131 of the motorcycle 100 is defined as an occupant protection area 151 when the motorcycle 100 comes in a frontal collision. In this embodiment, the "frontal collision" broadly includes a situation in which the motorcycle 100 collides with a front collision object (not shown for convenience). The "occupant protection area 151" is defined as a spacing that extends in a forward moving direction 191 of the occupant 101 for restraining to protect the occupant 101 who is being thrown out forward of the motorcycle 100 when the occupant 101 is being moved forward of the motorcycle 100 by kinetic energy during the frontal collision.

Figure 9:
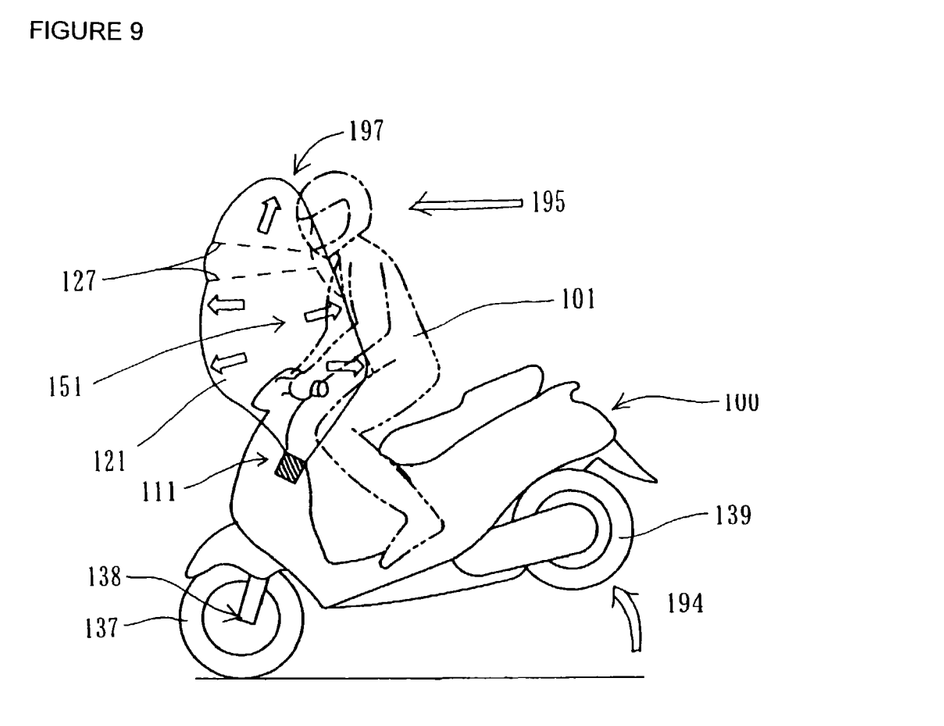
FIG. 9 shows a state in which the occupant is protected during a pitching motion.

The motorcycle 100 is sometimes rotated in the direction of arrow 194 around a rotation center 138 of the front wheel 137 during a frontal collision, as shown in FIG. 9. In the embodiment, such the behavior of the motorcycle 100 is defined as "a pitching motion." Also, the direction indicated by the arrow 194 is defined as "the direction of a pitching motion" of the motorcycle 100. A spacing for protecting the occupant 101 is defined as "an occupant protection area during a pitching motion, 197," the spacing extending in the moving direction 195 of the occupant 101 during the pitching motion when the occupant 101 is being moved forward of the motorcycle 100 (shown by reference numeral 195 in FIG. 9) by kinetic energy during the frontal collision. The occupant protection area during a pitching motion, 197, corresponds to "forward of the occupant during a pitching motion" in the invention. As understood from FIG. 9, the occupant protection area during a pitching motion, 197, is formed above the occupant protection area 151.

Figure 2:
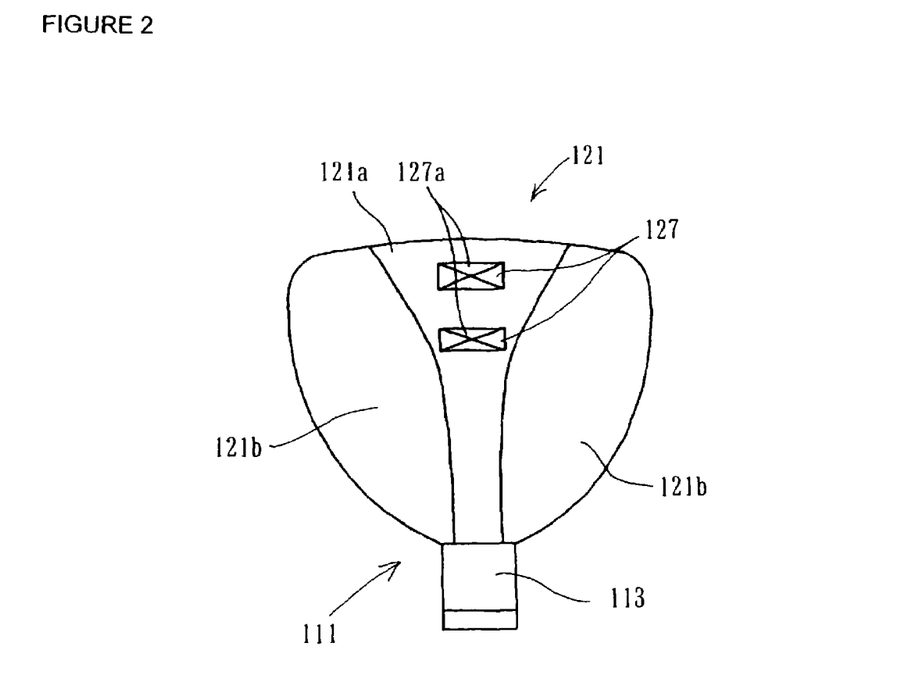
FIG. 2 shows an airbag apparatus according to the embodiment of the invention, showing a state in which an airbag is deployed to inflate.
Figure 3:
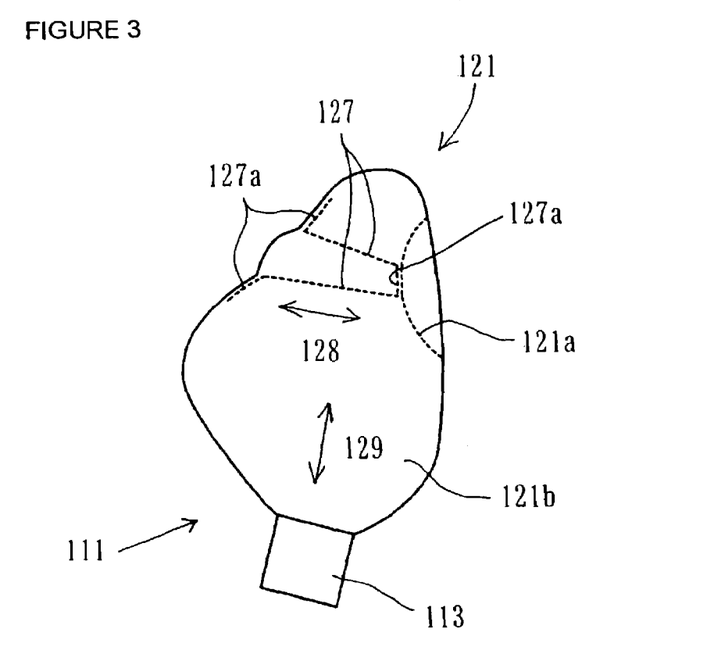
FIG. 3 shows the left side of the airbag apparatus of FIG. 2.
Figure 4:
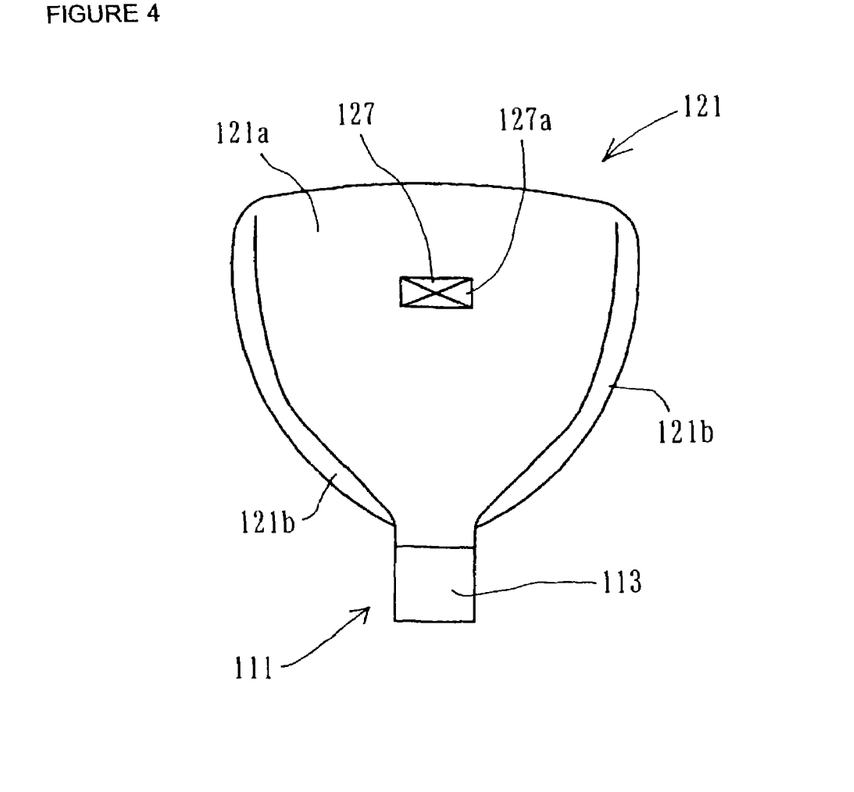
FIG. 4 shows the back of the airbag apparatus of FIG. 2.

The airbag apparatus 111 principally includes a retainer 113, an inflator (not shown for convenience) housed in the retainer 113, and an airbag 121 having a tether 127 therein. FIGS. 2 to 4 show the detailed arrangement of the airbag apparatus 111 with the airbag 121 being deployed.

The airbag 121 is a unit of a front panel 121a that constitutes the front and back thereof and side panels 121b that constitute the right and left side. The airbag 121 has a tether 127 (also called a tether strap) arranged therein. The tether 127 is stitched in an appropriately bent condition so as to connect the opposing portions of the inner wall (inner wall of the front panel 121a in the embodiment) of the airbag 121 through a stitch section 127a. With the tether 127 connecting the opposing portions of the inner wall of the airbag 121, the inflation of the airbag 121 is restricted for an extending direction 128 (refer to FIG. 3) of the tether 127, and the front panel 121a is given a little recess in the extending direction 128 of the tether 127 inside the airbag 121.

On the other hand, for a direction 129 (refer to FIG. 3) that intersects the extending direction 128 of the tether 127, the airbag 121 is allowed to inflate, thus exhibiting an inflated shape in the intersecting direction 129 as a whole. When the airbag 121 and the airbag apparatus 111 with such an arrangement are mounted to the motorcycle 100 shown in FIG. 1, the airbag 121 is allowed to have a sufficient inflation area in the occupant protection area 151 to receive the upper body of the occupant 101. As a result of restricting the inflating direction of the airbag 121 with the tether 127, the airbag 121 is allowed to inflate also in the occupant protection area during a pitching motion, 197, above the occupant protection area 151, as shown in FIG. 9.

Figure 5:
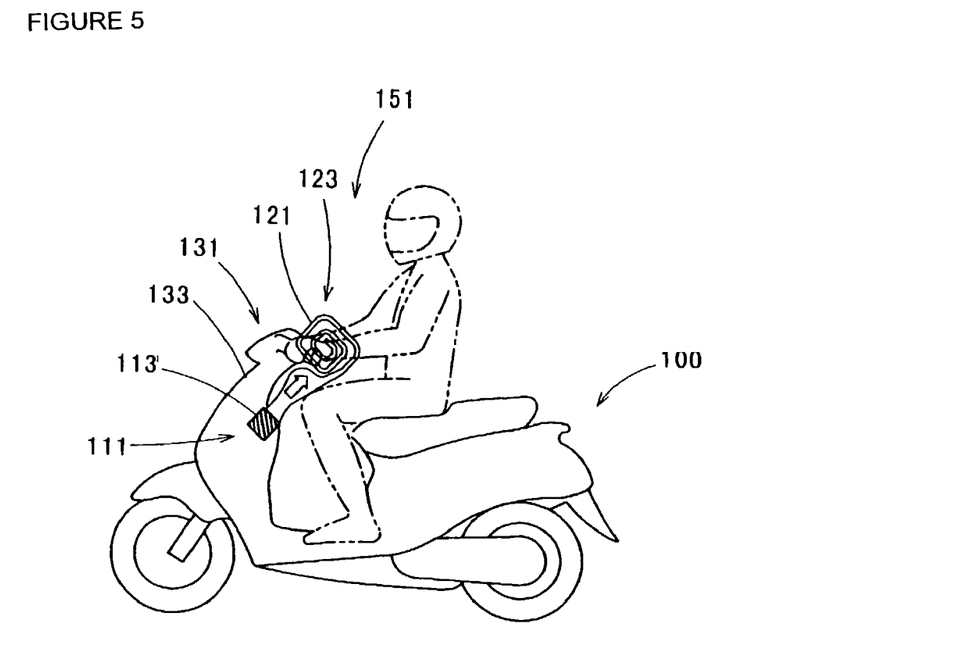
FIG. 5 shows the airbag apparatus of the invention in a state in which the inflation of the airbag is started.

The operation of the airbag apparatus 111 according to the embodiment will be described hereinafter with reference to FIGS. 5 to 8. When the motorcycle 100 comes in a frontal collision, the airbag 121 of the airbag apparatus 111 arranged at the front cowl 133 of the motorcycle 100 starts to be deployed from the retainer 113 by an inflator (not shown), as shown in FIG. 5. As clearly shown in FIG. 5, a rolling section 123 is formed so that the airbag 121 that is being deployed is moved toward the occupant protection area 151 in a minimum time while being separated from the body structure 131, wherein in the event of an accident, the rolling section 123 is rolled quickly from the retainer 113 toward the occupant protection area 151 to deploy the airbag 121.

Figure 6:
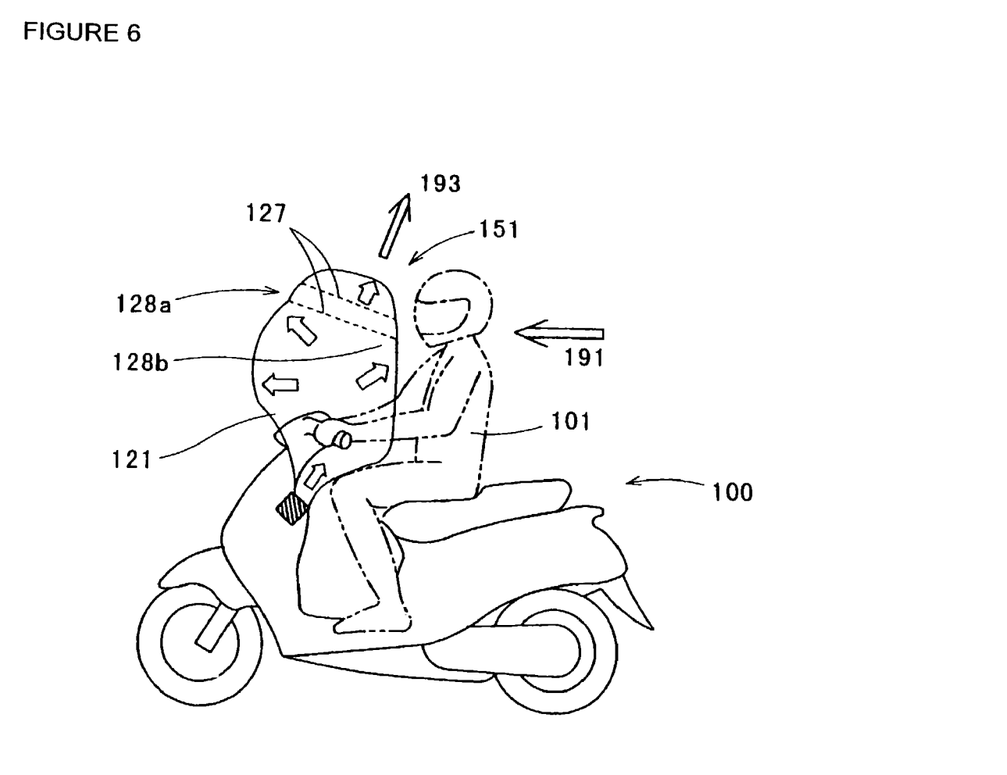
FIG. 6 shows a state in which the airbag is being inflated toward an occupant protection area.

The state of the airbag 121 during the inflation is shown in FIG. 6. FIG. 6 shows a state in which the inflation of the airbag 121 toward the occupant moving direction 191 is restricted and the inflation toward the intersecting direction 193 is allowed (promoted) with the tether 127 connecting opposing portions 128a and 128b of the inner wall of the airbag 121 in a direction that substantially corresponds to the occupant moving direction in a frontal collision, 191. The airbag 121 is allowed (promoted) to inflate toward the intersecting direction 193, so that the airbag 121 can be extended substantially in parallel with the front side of the occupant 101.

Figure 7:
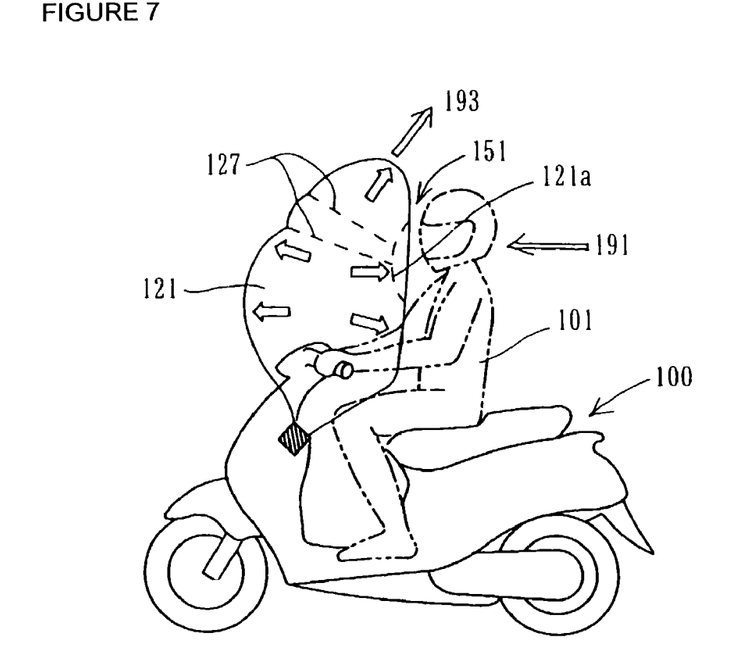
FIG. 7 shows a state in which the inflation of the airbag has been completed.

FIG. 7 shows a state in which the airbag 121 is fully deployed to be inflated. As shown in FIG. 7, the front panel 121a that constitutes the airbag 121 is pulled by the tether 127, so that inflation toward the occupant 101 is restricted. In the airbag 121 according to the embodiment, inflation toward the occupant moving direction in a frontal collision, 191, is restricted by the tether 127 and inflation of the airbag 121 in the intersecting direction 193 is allowed or promoted.

In other words, the inflation of the airbag 121 in the intersecting section 193, which is not restricted, is promoted owing to the restriction of the inflation in the occupant moving direction in a frontal collision, 191, with the tether 127. Accordingly, an area that is in parallel with the front side of the occupant 101 is increased without increasing the original size of the airbag 121 or without greatly changing the shapes of the front panel 121a and the side panels 121b which constitute the airbag 121. Particularly in the embodiment, there is no need to significantly increase the capacity of the airbag 121, thus having no need to increase the output of the inflator, which contributes to low cost and the compactness of the airbag apparatus 111.

Figure 8:
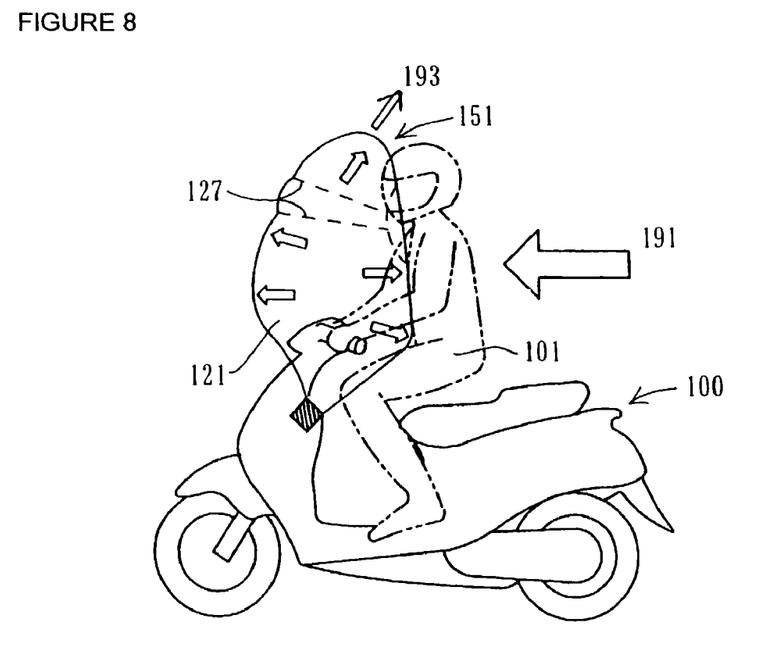
FIG. 8 shows a state in which an occupant is restrained by the inflated airbag.

As a result, when the motorcycle 100 comes in a frontal collision to move the occupant 101 in the occupant moving direction in a frontal collision, 191, by the impact, as shown in FIG. 8, the inflation of the airbag 121 is guided in the intersecting direction 193 in the occupant protection area 151 and the area that extends in parallel with the occupant 101 is increased, which ensures the restraint of the occupant 101, thereby providing complete protection of the occupant 101. Moreover, the embodiment offers an advantage in increasing deformation rigidity by the external force of the airbag 121 with the tether 127 that connects the opposing portions of the airbag 121, thus increasing the reaction force of the airbag 121 when receiving the occupant 101 who is moving forward at a given speed in the event of an accident and also improving the restraint performance for the occupant 101.

Furthermore, the motorcycle 100 that has come into a frontal collision may produce a pitching motion by impact energy, as shown in FIG. 9. In such a case, the airbag apparatus 111 according to the embodiment is constructed such that the airbag 121 extends in the occupant protection area during a pitching motion, 197, because of an increase in the area that extends in parallel with the occupant 101 by controlling the inflating direction of the airbag 121 with the tether 127. Accordingly, the airbag 121 ensures the restraint of the occupant 101 who is being thrown out in the occupant moving direction during a pitching motion, 195, thereby realizing complete protection of the occupant 101.

While the embodiment employs a structure to restrict the inflation of the airbag 121 substantially in the occupant moving direction in a frontal collision, 191, using the tether 127, other various modifications may be employed for the restricting direction of the inflation of the airbag 121 with the tether 127. For example, various arrangements are possible, which are not specifically shown, in which a plurality of the tether 127 is arranged in corresponding positions such as the head, face, thorax, abdomen, and shoulder of the occupant 101, to control the direction of the inflation of the airbag 121 so that the shape of the inflated airbag 121 fits to the front body form of the occupant 101 or, alternatively, a suitable combination of the arrangement positions of the tethers 127 is used to control the shape of the inflated airbag 121, thereby controlling which part of the occupant 101 is first restrained in a frontal collision.

Figure 10:
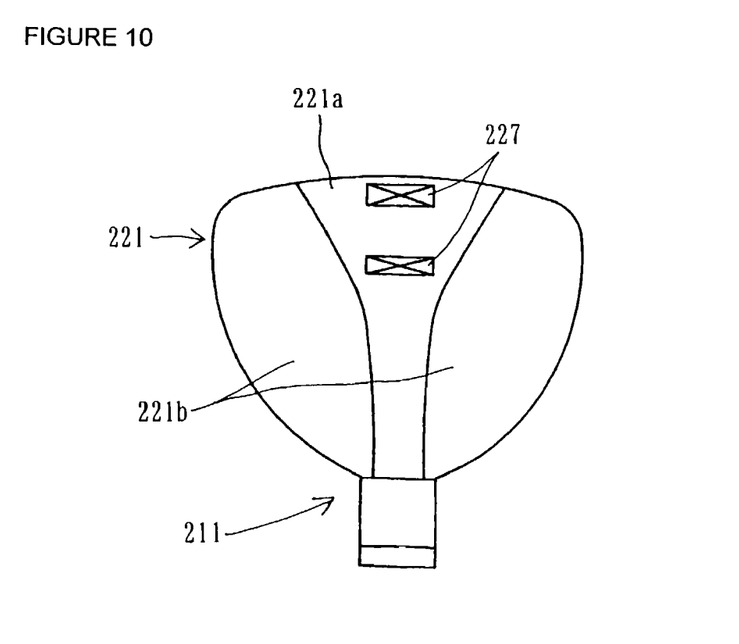
FIG. 10 shows the arrangement of an airbag apparatus according to a first modification of the embodiment of the invention.
Figure 11:
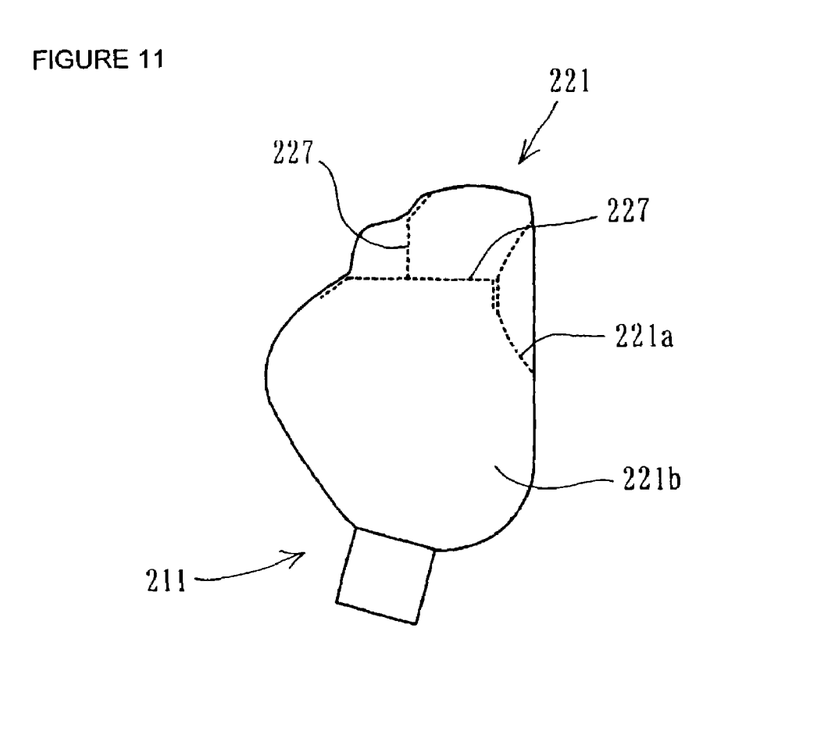
FIG. 11 shows the left side of the airbag apparatus of FIG. 10.
Figure 12:
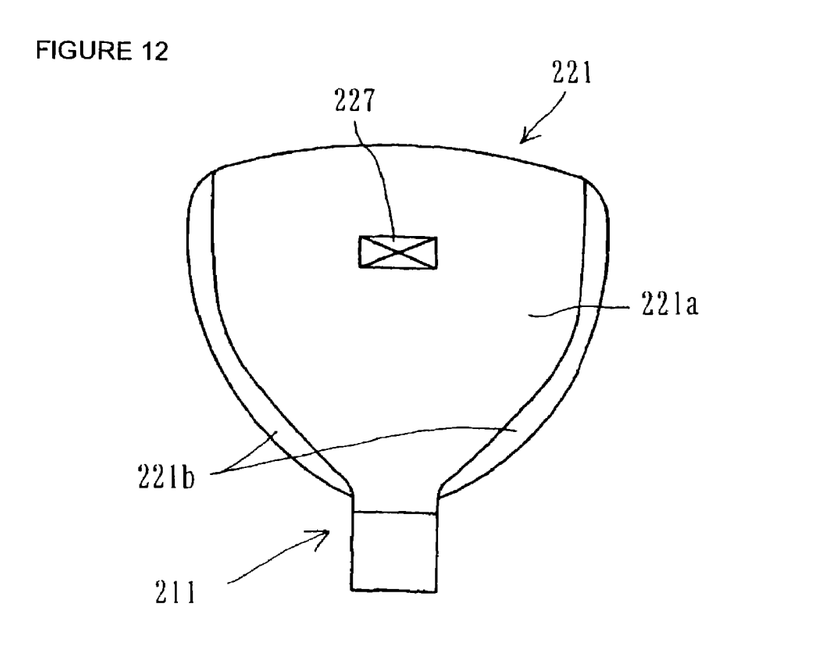
FIG. 12 shows the back of the airbag apparatus of FIG. 10.

A modification of the arrangement of the airbag 121 in the airbag apparatus 111 according to the embodiment will be described. An airbag 221 according to a first modification will be shown in FIGS. 10 to 12. In the first modification, not only the opposing portions but also the upper portions intersecting therewith are connected with tethers 227 on the inner wall of a front panel 221a that constitutes the airbag 221. This allows the rigidity of the airbag 221 to increase more. More specifically, the first modification has an arrangement that "the inflating direction of the airbag is restricted by inflation control means or tethers and also the inflation control means or the tethers are connected to other portions of the airbag." The arrangement can appropriately be combined with the invention of any claims.

Figure 13:
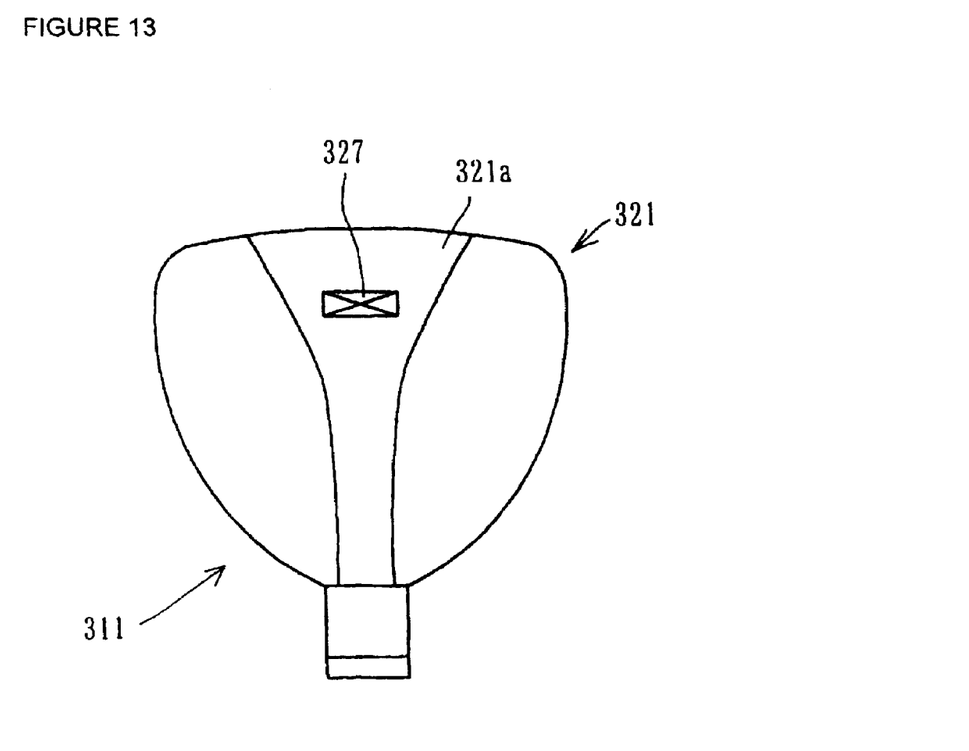
FIG. 13 shows the arrangement of an airbag apparatus according to a second modification of the embodiment of the invention.
Figure 14:
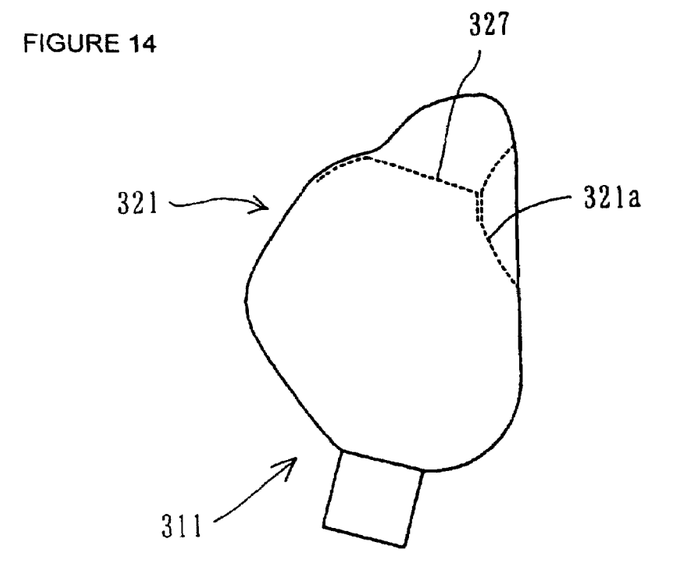
FIG. 14 shows the left side of the airbag apparatus of FIG. 13.
Figure 15:
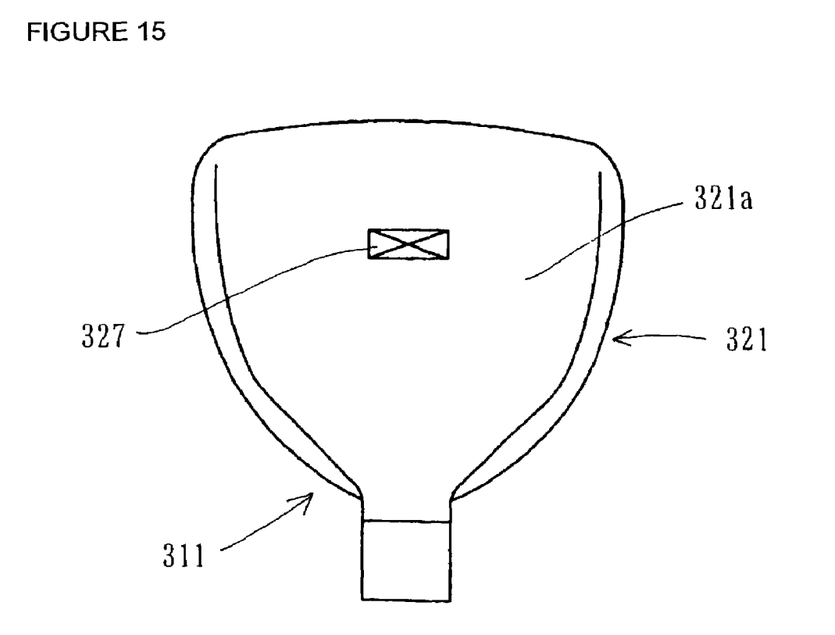
FIG. 15 shows the back of the airbag apparatus of FIG. 13.

FIGS. 13 to 15 show an airbag 321 according to a second modification. In the second modification, the inflating direction of the airbag 321 is restricted with one tether 327 arranged at the inner wall of a front panel 321a.

Figure 16:
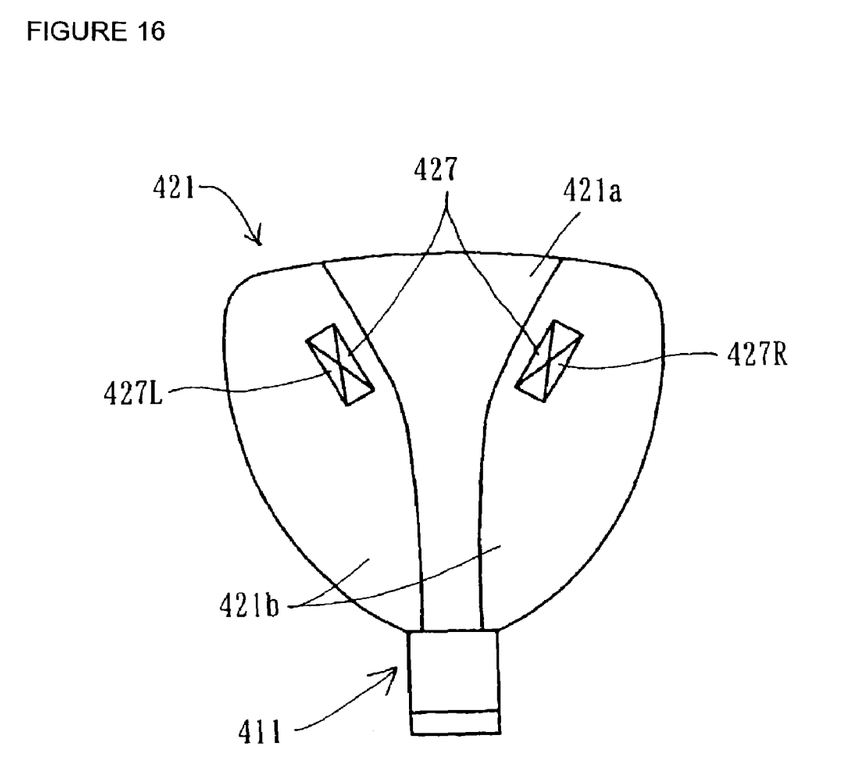
FIG. 16 shows the arrangement of an airbag apparatus according to a third modification of the embodiment of the invention.
Figure 17:
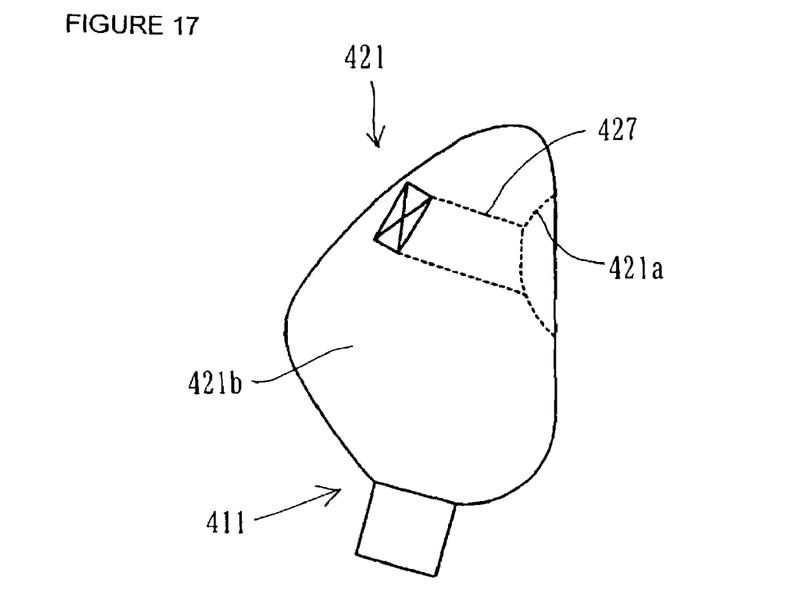
FIG. 17 shows the left side of the airbag apparatus of FIG. 16.
Figure 18:
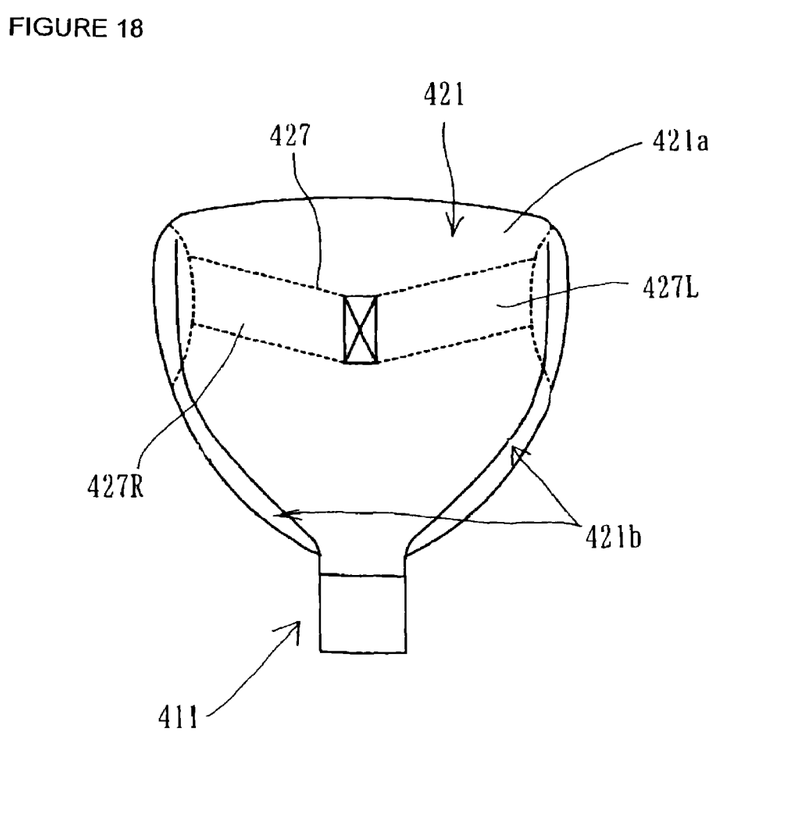
FIG. 18 shows the back of the airbag apparatus of FIG. 16.

FIGS. 16 to 18 show an airbag 421 according to a third modification. In the third modification, a front panel 421a and side panels 421b arranged at the left and right of the front panel 421a, which constitute an airbag 421, are connected with a V-shaped tether 427. With such an arrangement, the tether 427 itself does not extend in the restricting direction of the inflation of the airbag 421 (which corresponds to the direction designated by reference numeral 191 of FIG. 1), but a left member 427L and a right member 427R of the tether 427 connect predetermined portions of the front panel 421a and the side panels 421b of the airbag 421 so that the direction of the resultant force of the connection by the left and right members 427L and 427R substantially corresponds to the occupant moving direction in a frontal collision. With such an arrangement, the restricting direction of the inflation of the airbag 421 can be increased in width by the combination of the tethers, so that the freedom of the control of the inflation of the airbag 421 can be increased.

In other words, "An airbag apparatus is provided in preferred forms, wherein the inflation of the airbag in a direction of the resultant force of a first direction of the airbag and a direction different from the first direction is restricted by the connection of opposing portions in the first direction and the connection of opposing portions in the direction different from the first direction."

In other words, "An airbag apparatus according to either one of claims 1 to 4, wherein the inflation of the airbag in a direction of the resultant force of a first direction of the airbag and a direction different from the first direction is restricted by the connection of opposing portions in the first direction and the connection of opposing portions in the direction different from the first direction."

According to the invention, there is provided an airbag construction technique for a motorcycle, which contributes to complete protection of an occupant in the event of an accident.

What is claimed is:

1. An airbag apparatus for a motorcycle for protecting a rider in the event of frontal collisions, the airbag apparatus comprising:
    a retainer for the airbag mounted to the motorcycle;
    an airbag for being deployed in a primarily upward, vertical direction with the inflated airbag having an uppermost end portion spaced upwardly from the retainer; and
    an inflation control device generally aligned over and spaced upwardly from the retainer to extend thereover upon airbag inflation for restricting inflation of the airbag in a predetermined fore and aft direction that is generally aligned with rider movement due to frontal collisions and allowing inflation of the airbag in the upward vertical direction with the inflation control device sized so that size of the inflated airbag in the upward vertical direction is substantially larger than in the predetermined fore and aft direction and being connected to the airbag at at least two positions that are spaced from each other generally along the fore and aft direction and that are at an approximately equal distance from the retainer closer to the airbag upper end portion than to the retainer with the airbag deployed and inflated.

2. The airbag apparatus of claim 1 wherein the inflation control device comprises a tethering device for connecting generally opposing portions of the airbag so as to restrict airbag inflation in the fore and aft direction generally aligned with the rider movement.

3. The airbag apparatus of claim 1 wherein the inflation control device includes at least one tether that is connected to the airbag at an inflated airbag portion adjacent to the rider and which generally extends away from the rider in the fore and aft direction generally aligned with the rider movement.

4. The airbag apparatus of claim 1 wherein the airbag has a predetermined inflated volume, and
    an inflator sized to inflate the predetermined airbag volume with the inflation control device optimizing the inflated airbag volume extending in the upward direction for maximized rider protection while keeping the size of the inflator to a minimum.

5. The airbag apparatus of claim 1 wherein the airbag comprises a central panel and side panels, and the inflation control device comprises a connector attached to the central panel at one end and to either the central panel or the side panels at the opposite end thereof.

6. The airbag apparatus of claim 1 wherein the inflation control device increases rigidity of the airbag in the fore and aft direction generally aligned with the rider movement over rigidity of the airbag in the upward direction.

7. The airbag apparatus of claim 1 wherein the inflation control device includes a tether in the airbag that extends generally in the fore and aft direction as the airbag is deployed.

8. The airbag apparatus of claim 1 wherein the inflation control device includes a tether attached to the airbag at generally opposing forward and rearward portions therein so that upon airbag deployment and full inflation thereof a recess is formed in the airbag adjacent the rider.

9. The airbag apparatus of claim 1 wherein the inflation control device includes a tether or tethers that are connected at the predetermined positions in the airbag including generally opposing forward and rearward positions.

10. The airbag apparatus of claim 9 wherein the rearward position is adjacent the rider and the forward position includes a pair of connections on either side of the airbag toward the forward side thereof.

11. The airbag apparatus of claim 9 wherein the predetermined positions includes a generally upper position.

12. An airbag apparatus and motorcycle combination comprising
    a body of the motorcycle including front and rear wheels and a seat for a rider spaced rearward of the front wheel
    a retainer
    an airbag for being deployed from the retainer forwardly of the seat in the event of frontal collisions;
    at least one direction control member arranged in the airbag to optimize airbag inflation in a predetermined, upward primary inflation direction; and
    a plurality of connections between the at least one control member and the airbag that are at predetermined positions on the airbag and spaced from the retainer upon airbag inflation such that the at least one direction control member is generally aligned over and spaced upwardly from the retainer to extend thereover and the at least one control member and the connections to the airbag restrict inflation of the airbag in a controlled direction that is generally aligned with forward movement of the rider caused by frontal collisions so that size of the inflated airbag is substantially less in the controlled direction than in the upward primary inflation direction that is transverse to the controlled direction to minimize time for airbag inflation in the upward primary inflation direction wherein the inflated airbag has a rear portion that is adjacent and facing the rider and a front portion that is spaced forwardly therefrom and facing away from the rider, and the plurality of connections include connections that are generally disposed at the front and rear portions of the airbag to restrict size of the inflated airbag therebetween, and the front and rear connections are spaced from the an area between the control member and the retainer is larger than an area between the control member and an end portion of the airbag distal from the retainer in the primary inflation direction.

13. An airbag apparatus for a motorcycle having front and rear wheels and a seat for a rider spaced rearward of the front wheel, the airbag apparatus comprises:
    a retainer;
    an airbag for being deployed from the retainer forwardly of the seat in the event of frontal collisions;
    at least one direction control member arranged in the airbag to optimize airbag inflation in a predetermined, primary inflation direction; and a plurality of connections between the at least one control member and the airbag that are at predetermined positions on the airbag and spaced from the retainer upon airbag inflation such that the at least one control member and the connections to the airbag restrict inflation of the airbag in a controlled direction that is generally aligned with forward movement of the rider caused by frontal collisions so that size of the inflated airbag is substantially less in the controlled direction than in the primary inflation direction that is transverse to the controlled direction to minimize time for airbag inflation in the primary inflation direction and maximize an area of the airbag that is generally parallel to a front side of the rider wherein the inflated airbag has a rear portion that is adjacent and facing the rider and a front portion that is spaced forwardly therefrom and facing away from the rider, and the plurality of connections include connections that are generally disposed at the front and rear portions of the airbag to restrict size of the inflated airbag therebetween, and the front and rear connections are spaced from the retainer such that an area between the control member and the retainer is larger than an area between the control member and an end portion of the airbag distal from the retainer in the primary inflation direction, wherein the front connection comprises a pair of laterally spaced connections that generally restrict the size of the inflated airbag in a lateral direction.

14. The combination of claim 12 wherein the plurality of connections includes a generally upper connection beyond which the airbag extends upon inflation.

15. The combination of claim 12 wherein the retainer has the airbag stowed therein and is positioned to allow the airbag to inflate upwardly and forwardly and rearwardly, and the predetermined positions of the connections between the at least one control member and the airbag cause the primary inflation direction to be in the generally upward direction so that size of the inflated airbag is maximized in the upward direction and restricted in the controlled direction that is a forward and rearward direction.

16. An airbag apparatus and motorcycle combination comprising:
　a body of the motorcycle including front and rear wheels and a seat for a rider spaced rearward of the front wheel;
　a retainer having front and rear sides;
　an airbag for being deployed from the retainer forwardly of the seat in the event of frontal collisions;
　at least one direction control member arranged in the airbag to optimize airbag inflation in a predetermined, upward primary inflation direction; and
　a plurality of connections between the at least one control member and the airbag that are at predetermined positions on the airbag and spaced from the retainer upon airbag inflation such that the at least one control member and the connections to the airbag restrict inflation of the airbag in a controlled direction that is generally aligned with forward movement of the rider caused by frontal collisions so that size of the inflated airbag is substantially less in the controlled direction than in the upward primary inflation direction that is transverse to the controlled direction to minimize time for airbag inflation in the upward primary inflation direction with the greater size of the inflated airbag in the upward direction restraining the rider during a pitching motion of the motorcycle where the rear wheel rises up with the motorcycle body rotating forwardly during frontal collisions, wherein the inflated airbag has a rear portion that is adjacent and facing the rider and a front portion that is spaced forwardly therefrom and facing away from the rider, and the plurality of connections include connections that are generally disposed at the front and rear portions of the airbag to restrict size of the inflated airbag therebetween, and the front and rear connections are spaced from the corresponding front and rear sides of the retainer such that the front connection and the retainer front side are spaced approximately equal to the spacing between the rear connection and the retainer rear side, and an area between the control member and the retainer is larger than an area between the control member and an end portion of the airbag distal from the retainer in the primary inflation direction,
　wherein the retainer has the airbag stowed therein and is positioned to allow the airbag to inflate upwardly and forwardly and rearwardly, and the predetermined positions of the connections between the at least one control member and the airbag cause the primary inflation direction to be in the generally upward direction so that size of the inflated airbag is maximized in the upward direction and restricted in the controlled direction that is a forward and rearward direction, and
　the predetermined positions of the connections restrict size of the inflated airbag in a lateral direction transverse to the upward direction and the forward and rearward direction.

17. The airbag apparatus of claim 1 wherein the airbag includes only a single chamber to be inflated.

* * * * *

UNITED STATES PATENT AND TRADEMARK OFFICE
CERTIFICATE OF CORRECTION

PATENT NO. : 7,331,600 B2 Page 1 of 1
APPLICATION NO. : 10/601927
DATED : February 19, 2008
INVENTOR(S) : Yasuhito Miyata It is certified that error appears in the above-identified patent and that said Letters Patent is hereby corrected as shown below:

On the title page, item:

(56) References Cited, U.S. Patent Documents, for 2004/0150197 A1, delete "Ijima" and insert -- Iijima -- therefor.

(56) References Cited, Foreign Patent Documents, for JP 2001219885, delete "8/2004" and insert -- 8/2001 -- therefor.

Column 10, line 23, after "comprising" insert -- : --.

Column 10, line 25, after "wheel" insert -- ; --.

Column 10, line 26, after "retainer" insert -- ; --.

Column 10, line 47, after "direction" insert -- , --.

Column 10, line 54, after "the" insert -- retainer such that --.

Signed and Sealed this

Twenty-third Day of September, 2008

JON W. DUDAS
*Director of the United States Patent and Trademark Office*